Nov. 12, 1957   C. R. SEVENER   2,812,968
HANDLE

Filed May 21, 1954   2 Sheets-Sheet 1

INVENTOR.
CLYDE R. SEVENER
BY
McMorrow, Berman & Davidson
ATTORNEYS

Nov. 12, 1957 C. R. SEVENER 2,812,968
HANDLE
Filed May 21, 1954 2 Sheets-Sheet 2

INVENTOR.
CLYDE R. SEVENER
BY
McMorrow, Berman + Davidson
ATTORNEYS

United States Patent Office 2,812,968
Patented Nov. 12, 1957

2,812,968

HANDLE

Clyde R. Sevener, Pewaukee, Wis.

Application May 21, 1954, Serial No. 431,434

1 Claim. (Cl. 294—33)

This invention relates to a handle and has for its primary object to detachably support a cylindrical container to facilitate the discharge of the contents thereof.

Another object is to enable the handle to be transferred from one container to another with but a minimum of effort.

The above and other objects may be attained by employing this invention which embodies among its features a resilient bowed hand grip, closed loops carried by said grip and extending outwardly therefrom adjacent opposite ends thereof, and said loops converging under yielding pressure as they recede from the grip for exerting clamping effort on a cylindrical container encircled by said loops.

Figure 2:
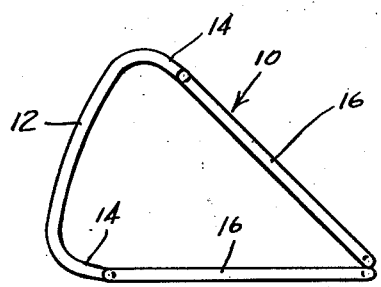
Figure 2 is a side view of the handle illustrated in Figure 1, showing it in completed condition.
Figure 3:
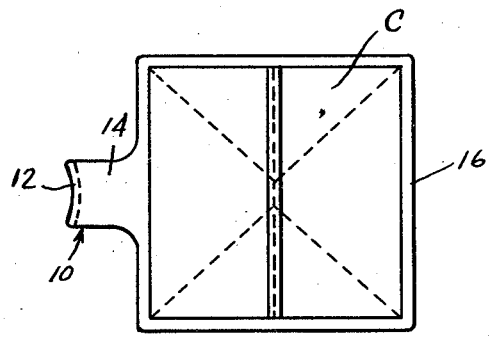
Figure 3 is a plan view of a container showing this improved handle in place thereon.
Figure 1:
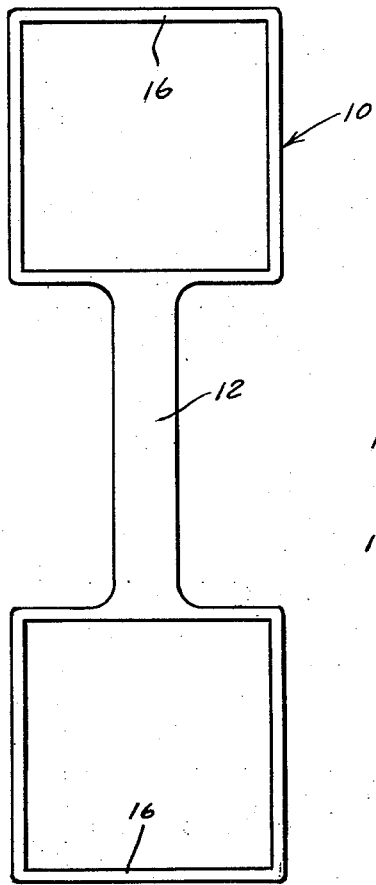
Figure 1 is a developed view of the handle embodying the features of this invention.
Figure 4:
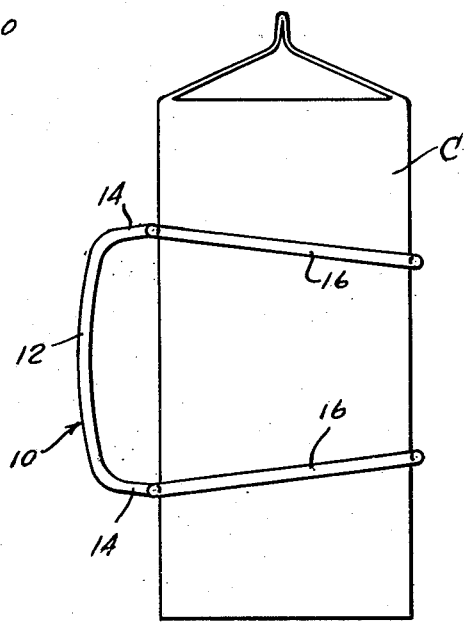
Figure 4 is a side view of Figure 3.

Referring to the drawings in detail, this improved detachable handle designated generally 10 comprises a handle 12 which is curved transversely, as illustrated in Figure 3, and bowed longitudinally, as illustrated in Figure 2, to define laterally projecting, resilient legs 14 carrying rectangular loops 16 which, as illustrated in Figures 3 and 4, are adapted to encircle a container C of rectangular cross section. Owing to the resilience of the legs 14 of the handle 12, the loops 16 are yieldingly urged to converge, as illustrated in Figure 2, as they recede from the handle 12. Thus, it will be seen that when the loops are separated from one another and placed in encircling relation to the container C, they will exert gripping effort on the container to frictionally hold the handle in place so that upon grasping the grip 12, the handle may lift the container C to facilitate the pouring of the contents therefrom.

Figure 6:
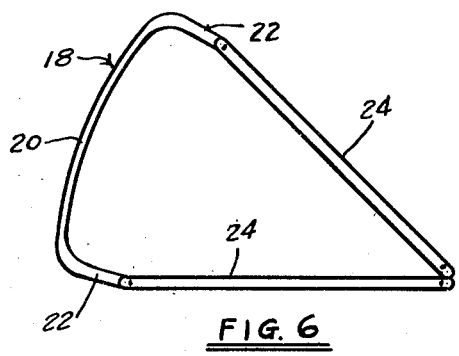
Figure 6 is a side view thereof showing it completed.
Figure 7:
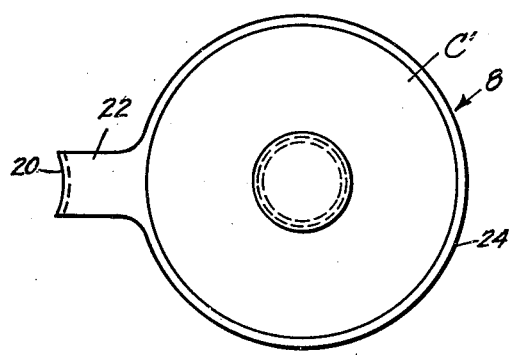
Figure 7 is a plan view of the modified form of the handle showing it applied to a circular cylindrical container.
Figure 5:
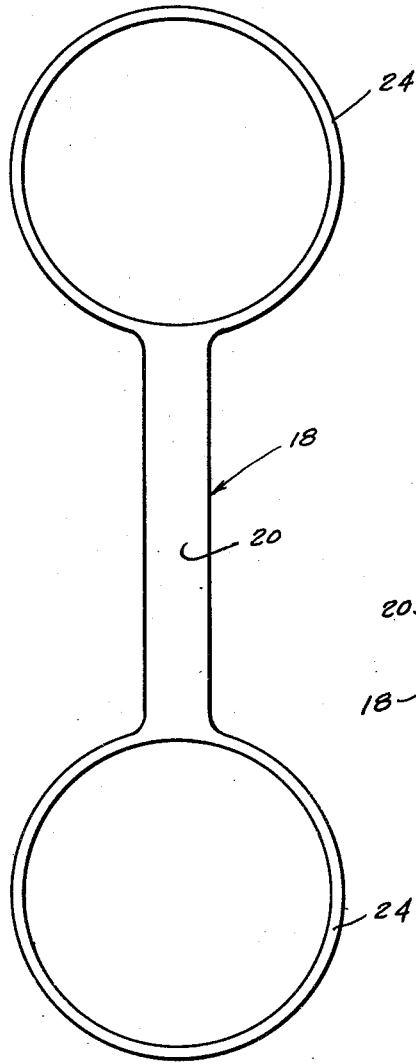
Figure 5 is a developed view of a modified form of the invention.
Figure 8:
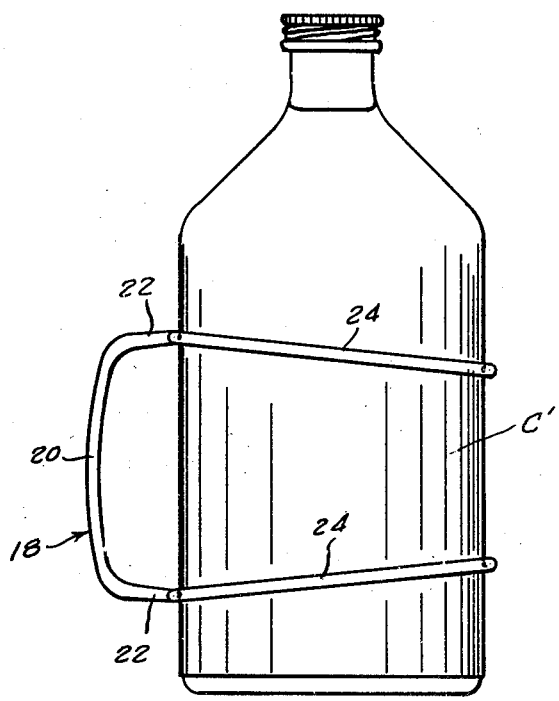
Figure 8 is a side view of Figure 7.

In the modified form of the invention illustrated in Figures 6 through 8, inclusive, the handle designated generally 18 comprises a grip 20 which, like the grip 12, is transversely curved, as illustrated in Figure 7, and carries adjacent opposite ends outwardly extending resilient legs 22 carrying circular loops 24 adjacent the ends thereof remote from the grip 20 which loops 24 are adapted to encircle a circular cylindrical container C', as illustrated in Figures 7 and 8.

Owing to the fact that the loops 24 converge under yielding effort as they recede from the grip 20, it will be evident that when they are separated to be fitted around the container C', as illustrated in Figure 8, binding effort of the loops against the wall of the container at longitudinally spaced points thereon will secure the grip 20 in place so that the handle 18 may be employed for lifting the container and pouring the contents therefrom.

Obviously, by separating the loops 16 or 24 so that they align axially, the gripping effort thereof on the containers C or C' may be released so that the handles may be removed from their respective containers for transfer to other containers of mating cross sections.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

A removable handle for a container comprising an elongated grip formed to a C-shape providing thereon a bight portion and legs projecting from the respective, opposite ends of the bight portion, said grip being spring tensioned in a direction to normally bias toward each other the ends of the legs remote from the bight portion; and container-encircling loops rigid with and projecting outwardly from said ends of the respective legs to extend about a container to be held, the tension of the legs being of such value and being exerted in such a direction as to bodily swing the loops toward each other into positions into which the loops are convergent in a direction away from the grip, the loops being relatively spreadable against said tension of the legs into substantially parallel relation to permit insertion of the container therethrough and being thereafter returned, under the bias of said spring tension, to convergent relation to dispose the loops in planes one at least of which is oblique to the length of the container, the portions of the loops diametrically opposite the loops of the legs swinging under said bias in arcs intersecting the adjacent portion of the container to in turn bias the container laterally toward the dimetrically opposite loop portions connected to the legs, thus to bind the diametrically opposite first and second named portions of each loop frictionally against the correspondingly diametrically opposite portions of the container.

References Cited in the file of this patent

UNITED STATES PATENTS

| | | |
|---|---|---|
| 1,486,967 | Kaufman | Mar. 18, 1924 |
| 2,021,416 | Hansen | Nov. 19, 1935 |
| 2,063,805 | Goetting | Dec. 8, 1936 |
| 2,305,628 | McKay | Dec. 22, 1942 |
| 2,424,094 | Herr | July 15, 1947 |
| 2,617,676 | Kinney | Nov. 11, 1952 |